June 27, 1961  A. J. BELFOUR  2,989,865
APPARATUS FOR TESTING THE PEEL STRENGTH OF JOINTS
Filed Dec. 24, 1958  2 Sheets-Sheet 1

INVENTOR.
ALBERT J. BELFOUR
BY
ATTORNEY

June 27, 1961 A. J. BELFOUR 2,989,865
APPARATUS FOR TESTING THE PEEL STRENGTH OF JOINTS
Filed Dec. 24, 1958 2 Sheets-Sheet 2

INVENTOR.
ALBERT J. BELFOUR
BY
Jerome A. Grose
ATTORNEY

United States Patent Office 2,989,865
Patented June 27, 1961

2,989,865
APPARATUS FOR TESTING THE PEEL STRENGTH OF JOINTS
Albert J. Belfour, Suttons Bay, Mich., assignor to Parsons Corporation, Detroit, Mich., a corporation of Michigan
Filed Dec. 24, 1958, Ser. No. 782,811
6 Claims. (Cl. 73—150)

The present invention relates to an apparatus for testing the peel strength of joints, e.g. adhesive joints. It comprises improvements in the apparatus and method for testing whereby an end of one of two members so joined (usually thin strips of aluminum) is secured to a winding drum and peeled from the other member by winding progressively on the drum, the force required for such peeling being continuously registered.

Tests carried out heretofore utilizing the winding drum method have employed expensive laboratory vertical tension test machines. Conventionally, one aluminum strip of the test specimen is first secured to a rigid bar as a backing; and the bar is suspended by one of its ends from an upper tension-applying point of the test machine. A turned-out end of the other aluminum strip is tucked and attached within a slot of a drum having substantial weight. Flexible bands around the flanges of the drum are brought downward and attached by a yoke to an attachment point in the laboratory floor. The upper tension-applying point has associated therewith a force registering means.

The application by the machine of a tension force, gradually applied, results in rotating the drum upward and peeling the strip attached thereto off from the other which has the rigid backing.

The objects of the present invention include:

Relieving test loads of the weight of the winding drum and its miscellaneous attachments, so no corrections need be made to the test results for the drum weight, and so that the weight of the drum is itself not an irreducible minimum test force; providing easy setting up of the test by a single person; and making provision that the drum will not twist under load and during the test.

Further objects include providing apparatus for testing not mere laboratory specimens but actual pieces of fabricated structure; duplicating temperatures likely to be encountered in service, and providing simple calibration means. Another important purpose is to permit the complete releasing and reapplying the test load as often as desired in the course of peeling a specimen, so that comparison may be made between resistance to peel under continuously loading and the resistance to initiating peel at any point.

These objects, together with others which will be apparent from the specification, are achieved in the present apparatus as embodied in the drawings, in which:

FIGURES 1a and 1b (left and right sides, respectively) show a plan view of my new apparatus.

FIGURES 2a and 2b (left and right sides, respectively) show a side elevational view thereof, with the cable to the load calibration scale disconnected (the connected position thereof being shown in dashed lines).

Figure 1A:
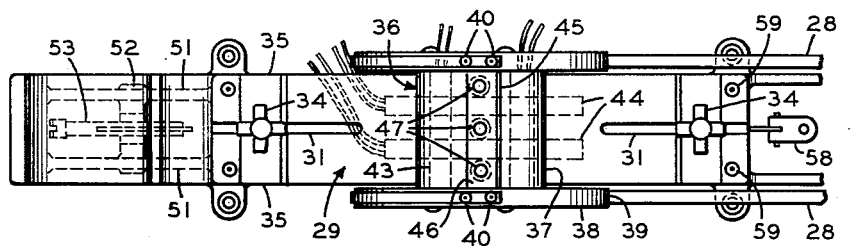

Referring now to the drawings by the detail part numbers marked thereon, I support upon a work surface $a$ of convenient height, a rigid bed or frame generally designated 10, which is preferably an elongated casting as shown, including side members 11 supported by lateral webs 12 spaced at convenient intervals. Supported at the right end of the bed 10 on an end pad 13 cast integrally therewith, is a reversible, variable speed, electric motor 14, a gear reduction train assembly 15, a winch 16 and a manually releasable dog clutch 17; also electrical controls generally designated 18 whereby the operation of the reversible motor 14 may be controlled.

Secured with one end wound around the winch 16 is a horizontal tension cable 19, connected at its other (left) end to one of the two diametrically opposed fittings 20 of a preferably steel load ring 21 across which a transducer 22 is connected for tension loading through an adjusting screw and nut assembly 23. The ring 21 together with the transducer 22 transmit the tension force from the cable 19, the ring deflection which accompanies the tension being measured by the transducer 22.

The transducer 22 is of the type which incorporates a linearly variable differential transformer. The signal from the transducer 22 is transmitted by appropriate electrical connectors 24 to a recording volt meter 25 which incorporates a power supply for the transducer 22. The elastic deflection characteristics of the ring 21, combined with the linear variation characteristic of the signal from the transducer 22, in effect measure the tension load in the cable 19, and the volt meter 25 registers and records it.

The left fitting 20 of the ring 21 is secured by a vertical removable pivot 26 to a horizontal lateral yoke 27, by which the tension force of the cable 19 is transmitted to and divided between the ends of two flexible steel straps 28, which extend parallel to each other and partly around the flanges of a winding drum hereinafter described.

Mounted on the bed or frame 10 near the left end thereof is a cast metal specimen table generally designated 29 having a flat horizontal table surface 30 which is elongated in the direction of the elongated bed and which in plan view is symmetrical about the line along which the tension cable 19 exerts its force. On this center line of symmetry, table slots 31 are provided, and clamp screws 32 may be adjustably positioned therein. Each of the clamp screws 32 has mounted thereon on the upper side of the table surface 30 a clamping foot 33 and a clamp handle 34.

The specimen table 29 has parallel longitudinal edges 35 spaced from each other a distance somewhat less than the spacing of the inner edges of the straps 28 as supported by the yoke 27.

The specimen table 29 supports the weight of a specimen winding drum generally designated 36, and its edges 35 hold the drum 36 from twisting and misalignment. In the embodiment illustrated, the drum 36 consists of a solid metal cylinder 37 whose length slightly exceeds the spacing of the parallel table edges 35. At each end of the cylinder 37 is mounted a radially-outward flange 38 having a cylindrical outer flange surface 39 onto which a band 28 winds, and to which the band end is secured by set screws 40. In order to permit interchangeable use of flanges 38 and drums 36 of differing diameters, the flanges 38 are removably mounted to the drum 36 by screws 40. The stresses imposed on the specimen as a whole include tension stresses; and such interchange affects the ratios of the combined stresses, making it possible to test under conditions which best reflect the peel strength of the adhesive.

Figure 2A:
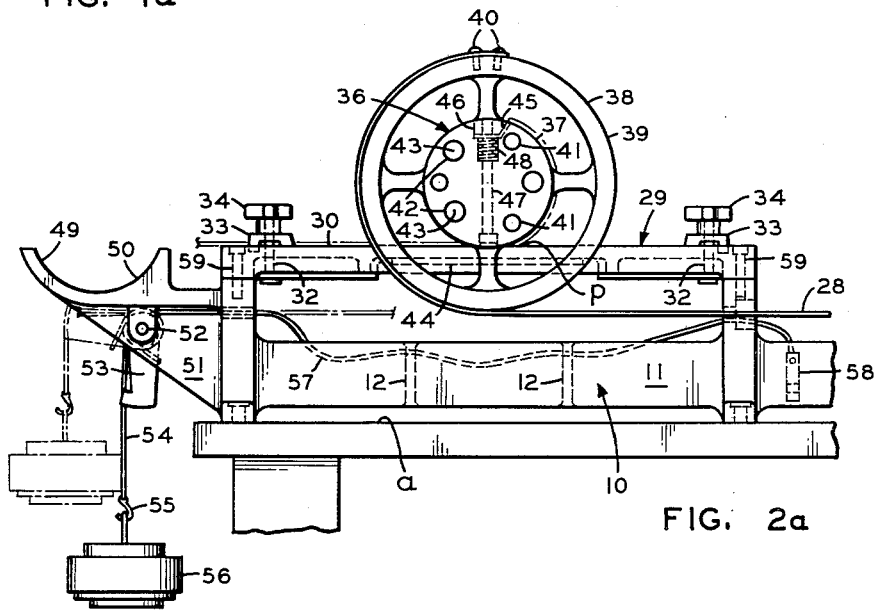

As shown in FIGURE 2a, the flanges 38 are provided with large openings 41 adjacent the outer surface of the drum 36 so that the progress of the test may be observed therethrough. Alternately, any selected portions of the drum 36 and flanges 38 may be made of transparent plastic material.

In the embodiment shown, the drum 36 has bores 42 parallel to but displaced from the central axis of the cylinder 37, in which bores 42 may be inserted electrical heating cores 43 actuated through suitable connectors to a power source, not shown. Electrical strip heaters 44 may be provided on the under side of the specimen table 29. Thus the specimen on the table 29 may be heated from both above and below the joint under test.

A slot 45 is provided in the surface of the cylinder 37 extending from one flange 38 to the other; and in this slot 45 a clamp bar 46 is secured by clamp screw assembly 47 having a spring provision 48 recessed in the cylinder 37 below the bottom of the slot 45. By this means, the end of one strip of sheet metal of an adhesively joined test specimen is secured to the cylinder 37, clamped between the slot 45 and the clamp bar 46. The specimen member so secured is wound upon the cylinder in a manner shown by the dashed lines around its right side as shown in FIGURE 2a. The point of peeling is indicated as p.

Aligned with the specimen table 29 adjacent its left end is a drum support cradle 49 having an upper arcuate surface 50, the radius thereof being greater than the radius of the drum 36 so that it may rest easily thereon. The width of the cradle 49, like the width of the table 29, is less than the spacing of the drum flanges 38. To permit easy handling, the straps 28 should be greater in length than the distance from the right end of the specimen table 29 to the center of the cradle 49.

Figure 2B:
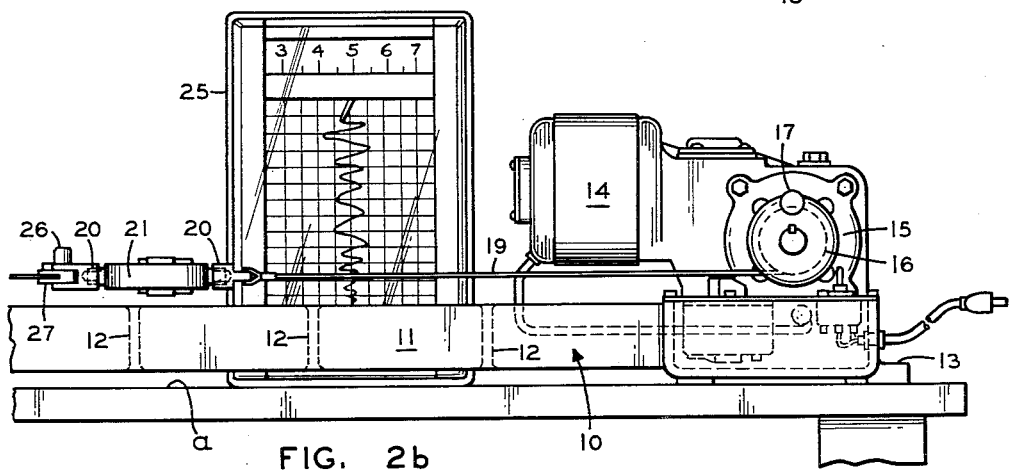

The cradle 49 is supported by a pair of support webs 51 aligned symmetrically to the centerline of the table 29. These webs 51 support between them, located beneath the cradle 49, a lateral pin 52, which is the fulcrum of the scale arm 53 whose outer end lifts a weight support cable 54 and weight hook 55 from which a scale weight 56 is suspended. The scale arm 53 is actuated by a scale cable 57, connected thereabout on a moment arm effectively shorter than the scale arm 53, to provide a predetermined mechanical advantage. The cable 57 extends to a releasable fitting 58. Shown in FIGURES 2a and 2b in released position, the cable 57 may be attached by its fitting 58 to the pivot pin 26.

In using the apparatus so far described, a test specimen, for example, is mounted flat on the table surface 36. Such a specimen, like specimens tested on the vertical apparatus of the prior art, may consist of two thin strips of aluminum, the lower being straight and the upper having a bent up tang end, adhesively joined save at the tang end. The specimen is arranged on the table surface 30 with the upward-extending tang at the right. The clamping foot 33 at the right end is applied only to the lower of the two strips. At the left end, the clamping foot 33 secures the entire specimen flat onto the table surface 30. The tang end is then inserted and clamped into the drum slot 45 by the clamp bar 46, the clamp screws 47 being securely tightened. In order to manipulate the drum during this operation, the clutch 17 is released.

With the right end of the upper strip of the test specimen so clamped, the drum 36 is set in place near the right end of the specimen table 29, the clutch 17 reengaged and the motor 14 operated so as to take up the slack of the cable 19 on the winch 16. When the slack has been taken up, the force exerted by the cable 19 through the yoke 27 is transmitted to the straps 28, which exert a tension force from the flanges 38, holding the drum 36 tightly against the tang end of the upper strip specimen and commencing to peel it and wind it upon the drum 36. Continuing the tension force causes the drum 36 gradually to roll along the upper surface of the specimen, causing progressive peeling; as at the point p, shown in FIGURE 2a. Inasmuch as the table surface 30 is horizontal, and the upper surface of the test specimen on which the drum lies is substantially so, the force exerted to roll the drum and cause peeling at point p is not substantially affected by the mass of the drum; hence the tension force measured by the transducer 22 is truly a function of the peeling force. The electrical response to this force is continuously recorded on the registering volt meter 25, whose calibration may be checked from time to time by releasing the yoke 27 from the pivot 26 and substituting scale weights 56 at the known mechanical advantage as the scale system provides.

Peel strength, particularly of adhesive joints, is sometimes affected by whether the peel operation is continuous or intermittent. In certain instances it has been found that a greater force is required to initiate peeling than to continue peeling. By the electrical controls 18, the force exerted through the winch 16 on the cable 19 may be discontinued and entirely released by reversing the motor 14. Thereafter the force may be reapplied so that peel is re-initiated. In this way, the force required for re-initiating peel at any desired point along the test specimen may be measured.

The electrical heating elements 43 provided in the drum 36 and the strip heaters 44 provided beneath the specimen table 29 may be utilized optionally, so that the peel strength of thin laminates at elevated temperatures may be ascertained. This is of particular importance where fabricated joints must perform at elevated temperatures if they are to meet required specifications.

Figure 3:
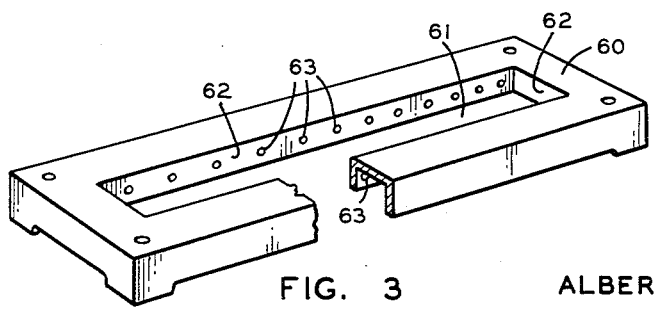
FIGURE 3 is a perspective view, partly broken away, showing an alternate form of specimen table having a recess in which fabricated parts may be clamped.
Figure 1B:
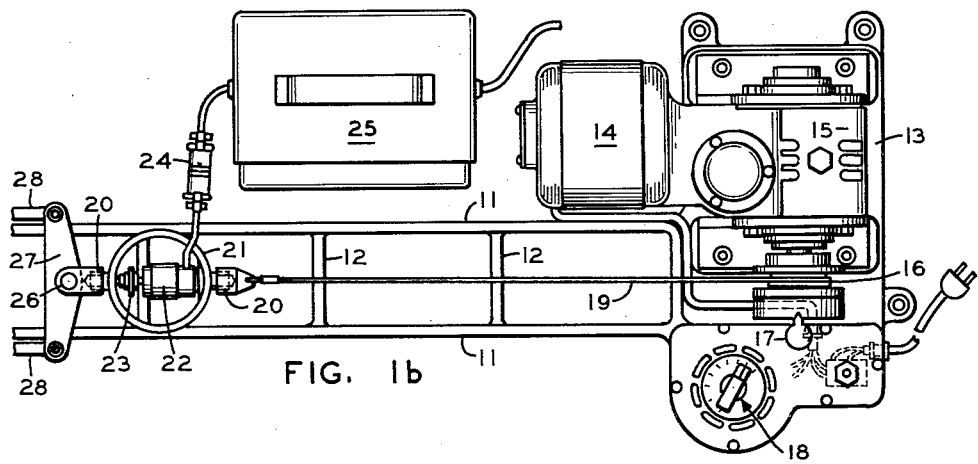
Figure 4:
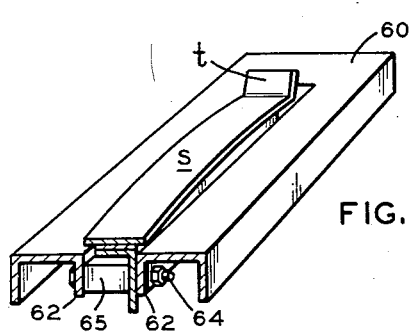
FIGURE 4 shows in schematic cross section, the bed of FIGURE 3 with a portion of a fabricated airfoil structure specimen clamped therein.

The present apparatus may be used for testing production specimens (those cut from routinely-manufactured parts), for which purpose other types of specimen tables may be used. Thus the specimen table 29 may be removed by withdrawing the screws 59 and there may be substituted for it a recessed specimen table 60 shown in FIGURES 3 and 4. This recessed specimen table 60 of the same length and width as the specimen table 29, is provided with a large centrally located recess 61 being bounded by downward-extending flanges 62. Specimen mounting means are provided in the flanges 62, which means may consist simply of aligned bores 63 through which specimen supporting bolts 64 are passed. Thus a specimen s cut out of an airfoil and including part of the upper cap of an airfoil rib with a strip of airfoil skin adhesively attached thereto and projecting at one end beyond the rib cap, may be mounted in the recess 62 by means of a filler block 65, by which the rib cap is clamped between the flanges 62. Although the upper contour of the specimen s may be somewhat curved, it is set so that its adhesive joint to be peeled extends as little as possible above the surface of the specimen table 60. The projecting end of the strip of skin is bent upward to form a tang $t$ attachment to the specimen drum 36. Such a production specimen s, cut from an actual fabricated article, may thus be tested in the same manner as the laboratory test specimens heretofore described.

It is apparent that various changes may be made in the specific apparatus described. Thus other sources of tension force may be provided, other than the cable 19, winch 16 and the described means for powering same. Likewise other tension force-measuring devices may be used than the ring 21 and transducer 22; similarly other tension force registering means than the recording volt meter 25. Similarly, other forms of heater means to the drum 36, specimen table 29 or either of them may be provided; other means for releasing and reapplying the tension force to apply loads re-initiating peel at various points along the specimen lengths, and other force comparison means than the specific scale construction shown. Likewise, the apparatus is well adapted to peel non-adhesive joints such as seam welds.

The foregoing statement is made to point out the novel functions and functional relationships which various parts of the apparatus described serve; and is not itself to be deemed a limitation of the scope of the present invention. To the contrary, this invention is to be construed broadly and fully coextensive with the claims which follow.

I claim:

1. Apparatus for testing the peel strength of test specimens of the type consisting of elongated joints between members, one of which is windable, comprising a source of tension force, a horizontal specimen table, means for securing one end of such test specimen thereon with its windable member uppermost and substantially horizontal, a winding drum supported by said specimen table over such elongated test specimen, said drum having a cylindrical surface and means for securing the other end of the windable member of such test specimen to said drum surface, flexible tension force-applying means connected to the source of tension force to draw the drum horizontally and rotatively whereby the windable member is caused to peel off the specimen and wind onto the drum, and means to measure the tension force so applied by said force-applying means, in combination with a frame to which the source of tension force is mounted and to which the specimen table is secured.

2. The apparatus as defined in claim 1, the drum having radially-outward flanges, the table having parallel edges spaced from each other less than the spacing of the drum flanges and aligned symmetrically with the direction of tension force exertable by said source, the flexible tension force-applying means including a pair of straps held separate at one end by a yoke by which said straps are spaced an amount corresponding to the spacing of the drum flanges, the other ends of said straps being secured windably upon the drum flanges.

3. The apparatus as defined in claim 1, the table having recess means wherein to accommodate portions of test specimens below the table surface.

4. The apparatus as defined in claim 1, there being provision for selectively releasing and reapplying the tension force.

5. The apparatus as defined in claim 1, portions of the drum axially outward of the specimen-securing means being transparent.

6. The apparatus as defined in claim 2, together with a drum-support cradle adjacent the end of the table remote from the source of tension force and narrower than the spacing of the drum flanges, together further with force-comparison balance including a tension connector beneath the table and alignable with the force-applying means and selectively connectable to and disconnectable from said force-measuring means, whereby the same may be calibrated.

References Cited in the file of this patent

UNITED STATES PATENTS

| | | |
|---|---|---|
| 1,991,854 | Johansson | Feb. 19, 1935 |
| 2,252,464 | Kearns et al. | Aug. 12, 1941 |
| 2,604,783 | Herrlinger | July 29, 1952 |
| 2,720,111 | Clark | Oct. 11, 1955 |
| 2,751,784 | Gershberg | June 26, 1956 |
| 2,834,205 | Pickup | May 13, 1958 |